United States Patent [19]

Helleur

[11] 4,079,585
[45] Mar. 21, 1978

[54] METHOD AND APPARATUS FOR REMOVING VOLATILE FLUIDS

[76] Inventor: Donald Edmund Helleur, 221 Mortlake Avenue, St. Lambert, Quebec, Canada

[21] Appl. No.: 595,832

[22] Filed: Jul. 14, 1975

Related U.S. Application Data

[63] Continuation-in-part of Ser. No. 386,406, Aug. 7, 1973, Pat. No. 3,920,505.

[30] Foreign Application Priority Data

Aug. 9, 1972  United Kingdom .............. 37102/72

[51] Int. Cl.² .............................................. F02G 3/00
[52] U.S. Cl. .............................. 60/39.02; 208/11 R; 166/256; 159/47 WL
[58] Field of Search .............. 159/4 A, 13 A, 47 WL, 159/13 C, 16 A, 48 R, 48 L, 49, 46 C, 4 MS, 4 VM, 17 VS; 162/30–32; 208/8, 11; 166/256; 60/39.02, 39.12

[56] References Cited

U.S. PATENT DOCUMENTS

| | | | |
|---|---|---|---|
| 1,491,486 | 4/1924 | Marquard et al. | 159/4 A |
| 2,377,282 | 5/1945 | Tomlinson | 159/47 WL |
| 3,057,700 | 10/1962 | Gross | 159/13 C |
| 3,073,672 | 1/1963 | Cederquist | 23/48 |
| 3,153,609 | 10/1964 | Markant et al. | 159/4 A |
| 3,211,538 | 10/1965 | Gross et al. | 159/13 C |
| 3,212,235 | 10/1965 | Markant | 159/4 A |
| 3,439,724 | 4/1969 | Mason | 159/4 A |
| 3,629,951 | 12/1971 | Davis et al. | 34/33 |
| 3,638,708 | 2/1972 | Farin | 159/4 A |

*Primary Examiner*—Norman Yudkoff
*Attorney, Agent, or Firm*—Lawrence I. Field

[57] ABSTRACT

A method and apparatus for the removal and recovery of volatile or evaporable substances from materials containing them. In other embodiments, the invention is readily applicable for the simultaneous incineration and concentration of such materials, particularly spent water-diluted effluents from industries and municipalities as well as for the generation of electric power from various thermal fuels, particularly power gas produced from coal or oil. In further embodiments, the reclamation of oil, from oil sands and shales, is effected as well as the cyclic pulping of cellulosic materials with cyclic recovery of heat and chemicals.

2 Claims, 18 Drawing Figures

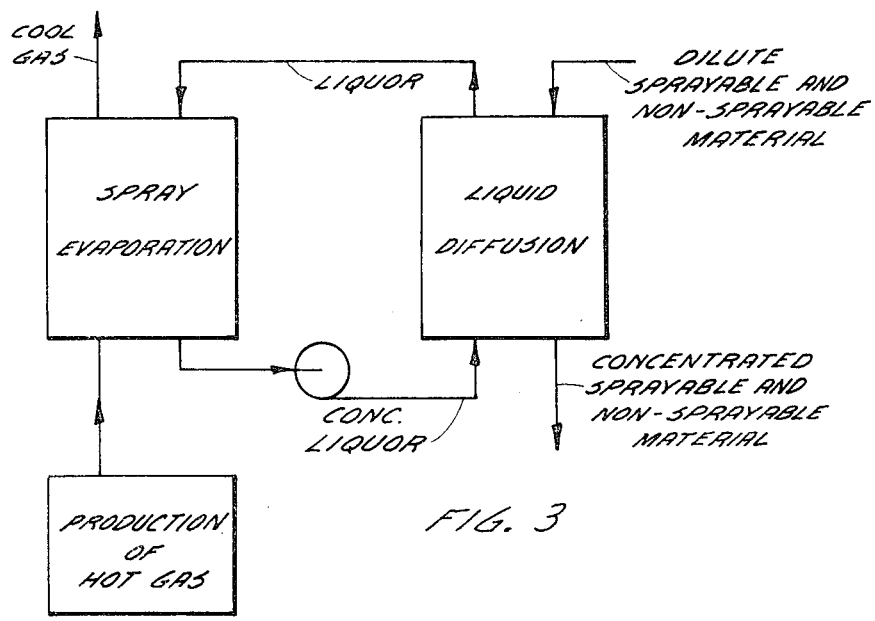
FIG. 3
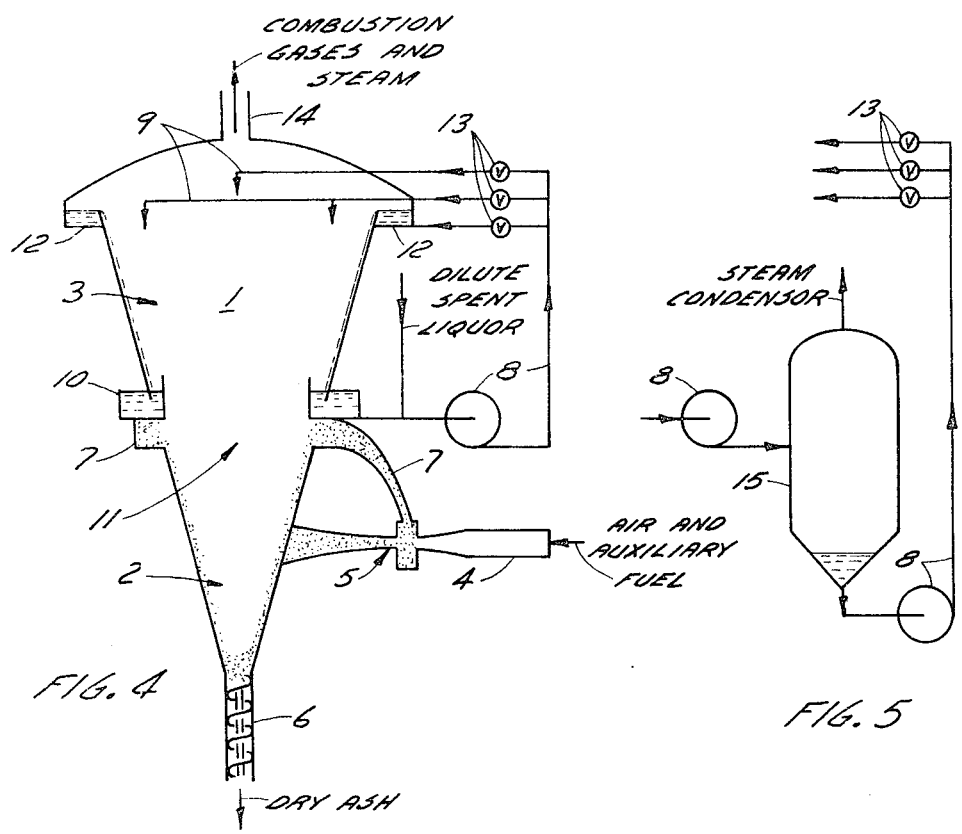
FIG. 4
FIG. 5

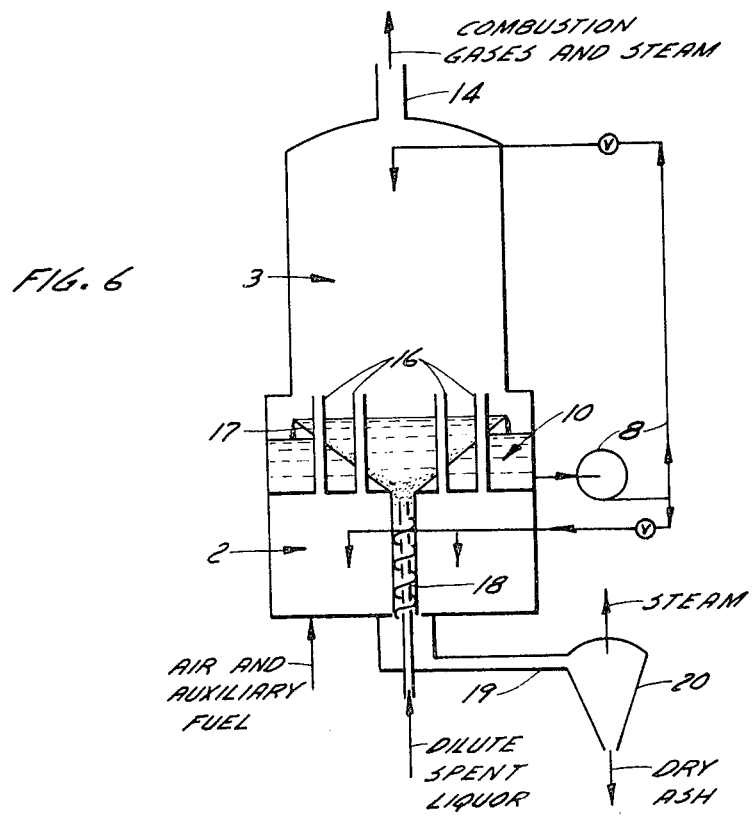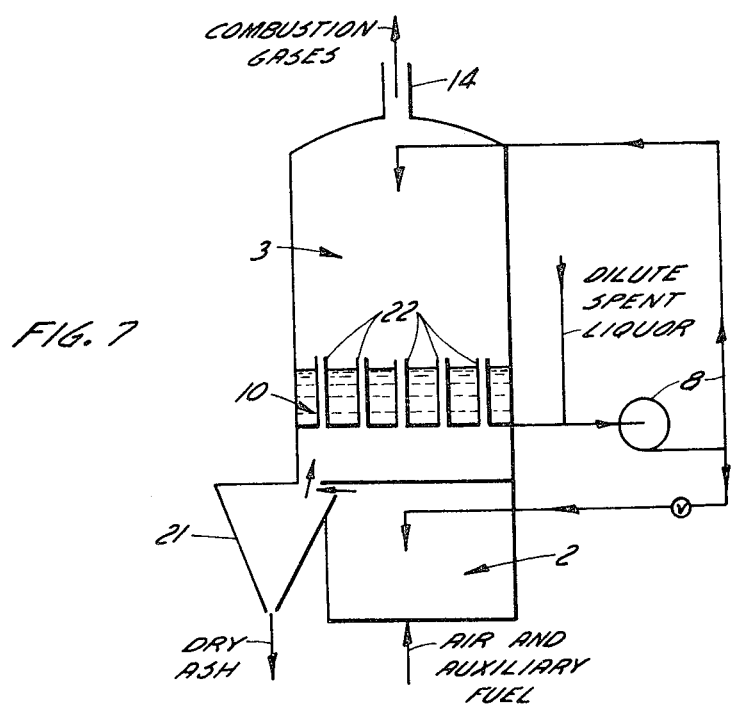

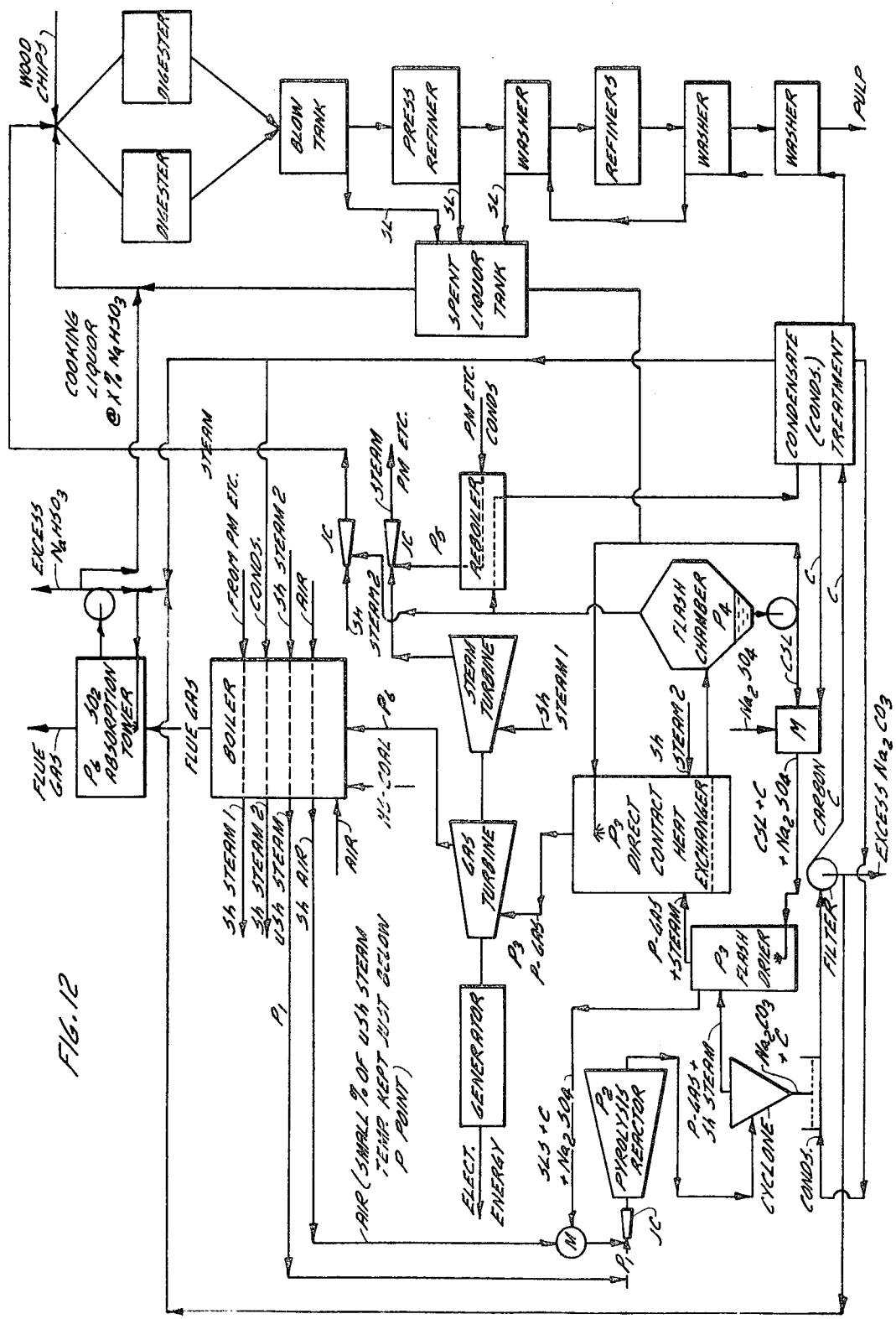

METHOD AND APPARATUS FOR REMOVING VOLATILE FLUIDS

This application is a continuation-in-part of copending Application Ser. No. 386,406, filed Aug. 7, 1973, now U.S. Pat. No. 3,920,505.

The invention involves producing hot gases and bringing them into an intimate, turbulent, direct-contact heat-exchange relationship with a constantly recycling flow of water or a liquid concentrate of the material; recovery of the water as steam or of the volatile substance is effected in a single-effect flash evaporator in association with the single direct-contact heat-exchange step. High thermal efficiencies can be obtained when operating at pressures substantially higher than atmospheric.

This invention relates to a method and apparatus for removing and recovering volatile or evaporable substances from materials containing them. In particular, it relates to a process for removing water from materials containing non-volatiles thereby concentrating the non-volatile part of the material for incineration or further processing. Other embodiments relate to the (a) generation of power from various thermal fuels; (b) reclamation of oil from oil sands/shales; (c) cyclic pulping of cellulosic materials with cyclic recovery of heat and chemicals.

In the manufacture of wood pulp, liquors and other organic noncellulosic, non-volatile substances are extracted from the wood by digestion with aqueous solutions called cooking liquors. After digestion and their separation from the pulp, these liquors are referred to as spent liquors. In some pulping operations, these spent liquors are reclaimed and concentrated and the organic content of the liquor burnt to recover the heat value, and the inorganic compounds collected for re-use. In other operations it is uneconomical to do this and the liquors are discharged into rivers and streams creating pollution problems. This is particularly true of very dilute spent liquors from processes producing pulps of very high yields (or high pulp to wood ratios); for these liquors evaporations or concentration costs would be very high because of the large water load.

It is, therefore, a primary object of the present invention to provide an inexpensive method of concentrating these liquors so that they may be disposed of by incineration and the heat value can be recovered where desired.

Many efforts have been made to develop methods of concentrating these liquors but even the best methods still employ fairly expensive equipment and operating problems, such as scaling, continue to appear.

These scaling problems are generally the result of using indirect contact techniques (such as tube heat exchangers) for transferring heat from one medium (steam) to another (the spent liquor). A direct contact heat exchange approach would eliminate many of these problems and if properly employed high levels of heat transfer can be effected.

Direct-contact methods of evaporation were used since very early times but improvements to these prior art approaches have unfortunately been lacking. One such apparatus, known as the Porrion evaporation, consists of circular disks of sheet metal assembled on a central shaft, and mounted over a trough containing the solution to be evaporated. Waste gases from an incinerator pass over the apparatus. As the shaft rotates the disks carry a film of liquid up into the gas where evaporation takes place. The system is cumbersome, inefficient and of low evaporative capacity.

Others, who use direct-contact methods and in their desire to improve thermal efficiencies, have developed very elaborate and expensive systems which use multiple stage heating and evaporation. None of these prior art inventors appear to be aware of how one could improve on the earlier simpler methods and make them respond to the needs of the day.

In present times when pollution and the disposal of spent wastes is of critical concern, there is urgent need for a simple method of getting rid of these wastes, particularly for a method whose thermal efficiency can be increased in a very simple manner should the increased cost warrant such an increase in efficiency. And in any event, the capital cost of any of the embodiments of this invention will be a fraction of the capital cost of these prior art methods.

It is therefore a particular object of this invention to improve direct-contact evaporation to a point where it will provide a simple and inexpensive method for disposing of spent liquors. A method whose thermal efficiency can be increased by a further simple process change.

It is also a general objective of the present invention to improve direct-contact techniques such that they can be used in removing volatiles from materials containing them in a highly compact and efficient manner. Such volatile would include evaporable and condensable substances such as water, organic solvents and the like, as well as substances which can be stripped from solutions containing them, for example gases such as sulphur dioxide, ammonia, hydrogen sulphide, chlorine, carbon dioxide, nitrogenoxide and the like which would be present in solutions containing them.

With the above and other objects in view, this invention resides in the novel features of form, construction, arrangement and combination of steps and means presently described and pointed out in the claims.

Broadly speaking, the present invention relates to a method and apparatus for evaporating and/or stripping volatile substances from material containing them particularly spent industrial materials containing substantial amounts of water (e.g. effluents from pulp and paper plants) or organic solvents (e.g. effluents from oil refineries and the like) as well as municipal wastes. If the material is a fluid the volatile components can be removed more directly; for non-fluid materials the volatiles may be removed by an indirect approach.

A typical form of the invention, comprising a process for concentrating and burning such wastes as spent pulping liquors having a high water content, comprises:

(a) burning or incinerating the spent liquor in an atmosphere of air or substantially pure oxygen (preferably oxygen) at as high a water content as is feasible, to produce hot gases containing a substantial portion of their heat available in the form of radiant energy and steam (i.e. a condensable gas) and removing any ash or smelt that has formed;

(b) introducing these radiant and condensable gases while they are burning and/or immediately thereafter into the lower end of a vessel containing a lower reservoir of the spent liquor and an upper freeboard area and venting the gases after they are cooled and saturated with water vapour at the top end of the chamber;

(c) removing spend liquor from the lower reservoir and bringing it into intimate and turbulent contact with the hot gas, as, for example, by violently spraying the liquor into the freeboard area in such a way that all three main methods of heat transfer (i.e. radiant, mass and conductive transfer) are used to the fullest extend possible to thereby cool the hot gases as quickly as possible and convert a further portion of the water content of the spent liquor into steam and/or water vapour which can be vented along with the gas (or alternatively used to heat the liquor for purposes of flash evaporation in a separate chamber) and then allowing the remaining portion of the spent liquor to collect in the lower reservoir;

(d) continuing to remove and spray the spent liquor in a recycling manner until the recycling spent liquor reaches a concentration where it will burn as described in the above mentioned step;

(e) introducing sufficient unconcentrated spent liquor containing a high water content into the reservoir and removing sufficient concentrated liquor from the reservoir for burning in order to keep the recycling liquor at the desired concentration and level in the reservoir.

As mentioned under (c) a further embodiment provides for the removal of a substantial portion of the water content of the spent liquor independently of the gas and comprises modifying step (c) above as follows:

(c) (modified) removing spent liquor from the lower reservoir and spraying it into a flash chamber, having a pressure lower than that in the vessel, to convert a portion of the spent liquor into steam, thereby concentrating the liqour and cooling it, removing the steam from the flash chamber, removing the cooled concentrated spent liquor and spraying the liquor into the freeboard area to cool the gas and condense a portion of the steam and thereby heating the liquor, allowing the heated liquor to collect in the reservoir.

A further important embodiment provides for a substantial increase in the thermal efficiency of the above embodiments by conducting all of the above process steps at elevated gas pressures (i.e. pressure substantially above atmospheric) for example, if the pressure in the combustion and freeboard areas is increased to the 250 psia (pounds per square inch absolute pressure) level, steam may be removed from the flash chamber at a level in the order of 70 psia, at this level the steam is readily usable as process steam. At the lower pressure levels, the steam produced can be used for simple heating purposes.

In fact, in certain situations, certain embodiments particularly the very simple one without the flash evaporation step, could be conducted at pressures below atmospheric (particularly, where the vented gases contain a very high proportion of water vapour i.e. an easily condensable gas). At these lower pressures, the amount of water vapour ventable from the system can be increased substantially. In the case of water vapour, these lower pressures could be easily and simply maintained by passing the vented gases through a cold water spray tower thereby condensing the water vapour and then discharging the non-condensable gases through a vacuum pumping system to the atmosphere.

Of course, at pressures above atmospheric the opposite is true and less water vapour is ventable, the amount being inversely proportional to the total pressure in the system, and it is this fact which makes possible the higher thermal efficiencies at these higher pressures whenever the flash evaporation step is used. Such facts were not properly realized and taken advantage of by prior inventors.

Direct-contact heat-exchange as mentioned can be a very efficient method particularly if the heat required for the evaporation is transmitted by radiation rather than by conduction or convection. Thus for maximum efficiency it has been found that the present invention should be carried out, whenever possible, by introducing into the freeboard area those gases having (radiation) emission bands of a significant magnitude. Such gases are generally heteropolar and composed of non-symmetrical molecules; those of industrial significance include carbon monoxide, hydrocarbon, water vapour, carbon dioxide, sulphur dioxide, ammonia and hdyrogen chloride. In the above example, it was therefore desirable to carry out the combustion in the presence of as much water as possible; in addition, since nitrogen is not a highly radiant gas, it is desirable to use substantially pure oxygen rather than air, to effect the combustion of the organic materials.

In addition, direct-contact heat-exchange can be further increased many fold by making proper use of mass heat transfer i.e. by involving to the fullest extent the use of a volatile or evaporable condensable gas as a medium of heat transfer. Fortunately, water with its high latent heat of condensation or evaporation, is a common constituent in most industrial wastes. Thus, as another prominent feature, this invention should be carried out in such a way that the combustible energy of the material in the spent wastes is transferred as soon as possible into the latent energy of a condensable gas such as water vapour or steam, so that in that form this latent energy will be readily and quickly convertible/available as a source of heat for heating further liquor.

In fact the same water may condense and evaporate many times in a given pass through the heat exchange step, but in so doing it serves its function of transfering the heat from the combustion products to and from the recycling liquid and this invention provides the environment for this to take place.

As mentioned previously, none of the previous prior art has disclosed how these various modes of heat transfer can be properly combined in a simple efficient and compact way to accomplish the various objectives hereinabove described.

An interesting further application of the above two features, involves passing low grade process steam such as steam from paper/pulp driers or from pulping operations through the gas heating step so that the heat is transferred to a gas which is capable of re-transmitting the heat energy efficiently to the liquors to be treated. In addition, if the present process is to be carried out at elevated pressures this steam will have to be put through a compressor and its total energy will then be made available at a more useful level (that is after is has condensed in the vessel and re-evaporated in the flash chamber).

In the above example, the spent liquor contained both combustible organic compounds as well as inorganic compounds, the heat values of the combustibles were used to concentrate the dilute liquor, and the values of the inorganics could be recovered from the residual ash following the combustion step. For spent liquors containing smaller or negligible amounts of combustibles, the thermal energy required to sustain the present process may be supplid by or from other means, for example: burning oil, coal and the like; using waste heat from other operations such as that from metallurgical operations.

In the above example, the emphasis was on the concentration of the spent liquor through the evaporation of the water; in other applications of the present invention undesirable volatiles can be removed from liquors containing them by spraying such liquors in the freeboard area and allowing the gases to carry them away. Where desirable these volatiles can then be stripped/reclaimed from the gases by well known absorption operations. When the modified (c) step above is used a large portion of these volatiles will also be removed in the flash chamber and can be easily recovered.

It will be apparent from the above descriptions that the present invention provides several opportunities for by-product production, for example: inorganic compounds from the combustion of the concentrated liquors; hot water from the condensation of the steam from the flash chamber or process steam from the flash chamber when the operations are carried out at higher pressures; heat from the humid gases vented from the vessel or mechanical energy from these gases whenever the operations are carried out at elevated pressures (this mechanical energy may be extracted by passing the gases though a gas expander and the shaft energy used directly or converted into electrical energy); reclamation of oil from oil sands/shales; cyclic pulping of cellulosic materials with cyclic recovery of heat and chemicals.

The present invention will be discussed further at least in part with reference to the following drawings which are diagrammatic representations of the following embodiments of the invention:

FIG. 3 is another basic embodiment involving both sprayable and non-sprayable materials;

FIG. 4 is one embodiment of the method and apparatus in which the combustion, ash separation, direct-contact evaporation and scrubber are very closely associated;

FIG. 5 is a representation of a section of another embodiment of the method and apparatus in which the combustion, ash separation, direct-contact evaporation and scrubber are again very closely associated as shown in FIG. 4 except that a substantial portion of the evaporation now takes place in a separate flash chamber;

FIG. 6 is an embodiment involving another method of handling the combustion and the ash;

FIG. 7 is an embodiment involving still another method of handling the combustion and the ash;

FIG. 12 is an embodiment which is applied to a cyclic sodium bisulphite high-yield pulping, heat and chemical recovery process.

Figure 1:
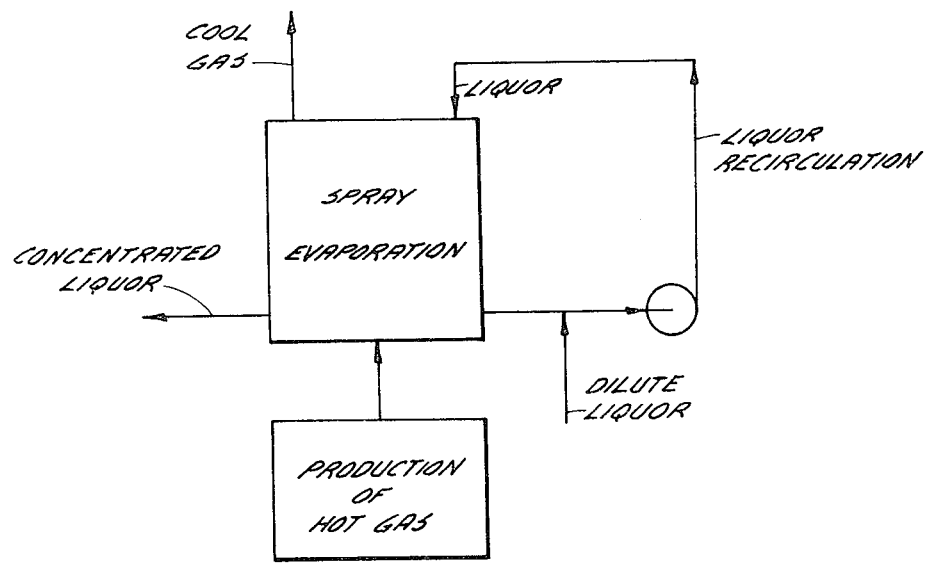
FIG. 1 is one basic embodiment.

Referring now in more detail and by reference characters to the drawings, one embodiment of the present invention is illustrated in FIG. 1 where it is shown in one of its simplest forms.

As shown in FIG. 1, hot radiant gases are produced and are immediately introduced into an area where concentrated liquor is being continuously spray evaporated and recirculated, the hot gases are cooled by the spray evaporation and carry the volatile liquid medium from the liquor with them as they leave the vessel, the volume of liquor is kept in balance by continuously feeding dilute liquor into the system and withdrawing concentrated liquor, which may be used to produce the hot gases or used in other processes. As will be further discussed, these gases are brought into a single intimate, turbulent direct-contact relationship with this recycling liquid so as to utilize to the fullest extent the three main methods of heat transfer mentioned above.

Figure 1A:
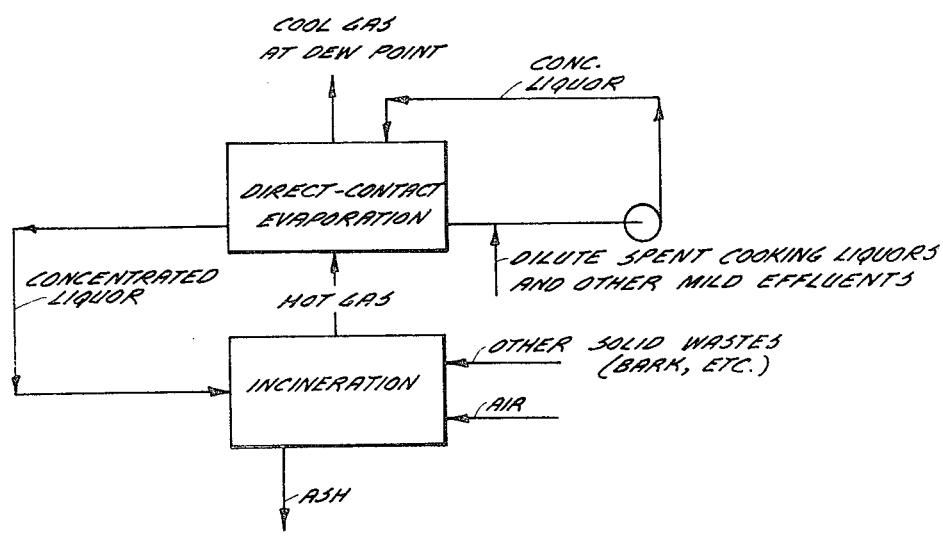
FIG. 1A is an example of that shown in FIG. 1.

FIG. 1A illustrates how the embodiment of FIG. 1 could be applied to pollution abatement problems associated with the pulp and paper industry. Here the simultaneous concentration and incineration of solid, liquid and gas wastes of pulp and paper mills is effected by a relatively simple procedure; and while it yields the lowest thermal efficiency (compared to other embodiments of this invention), it does require the lowest capital costs which would be attractive to the small pulp mills unable to justify larger more complex units. The gas wastes would be trapped and atmospheric pollution reduced merely by adding specific chemicals to the circulating liquor; the scrubbing function effected by the direct-contact heat exchange step would remove various gases, volatiles and entrained solids and liquids in the hot gases from the incinerator.

Figure 2:
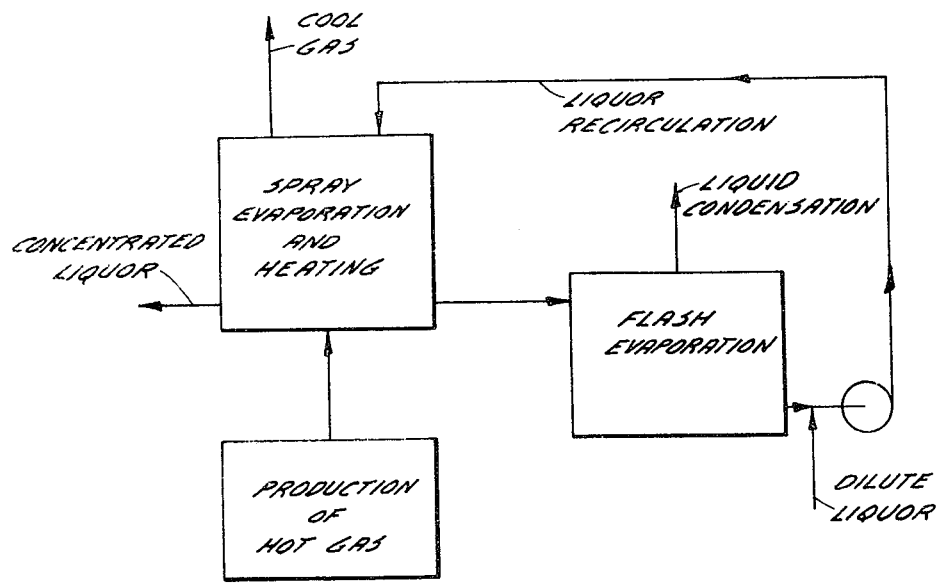
FIG. 2 is another basic embodiment.

FIG. 2 illustrates a variation to the above process wherein the circulating concentrated liquor is flash evaporated in a single-effect evaporator as well as spray evaporated in the heat exchanger; and the vacuum of the flash evaporation is supplied by the condensation of the volatile liquid medium (alternatively or in addition to the condensation the vacuum could be maintained by vacuum pumping). Alternatively and for better process control, the liquor recirculation of FIG. 1 could be maintained at the same time that the liquor is recirculated through the flash chamber.

Figure 2A:
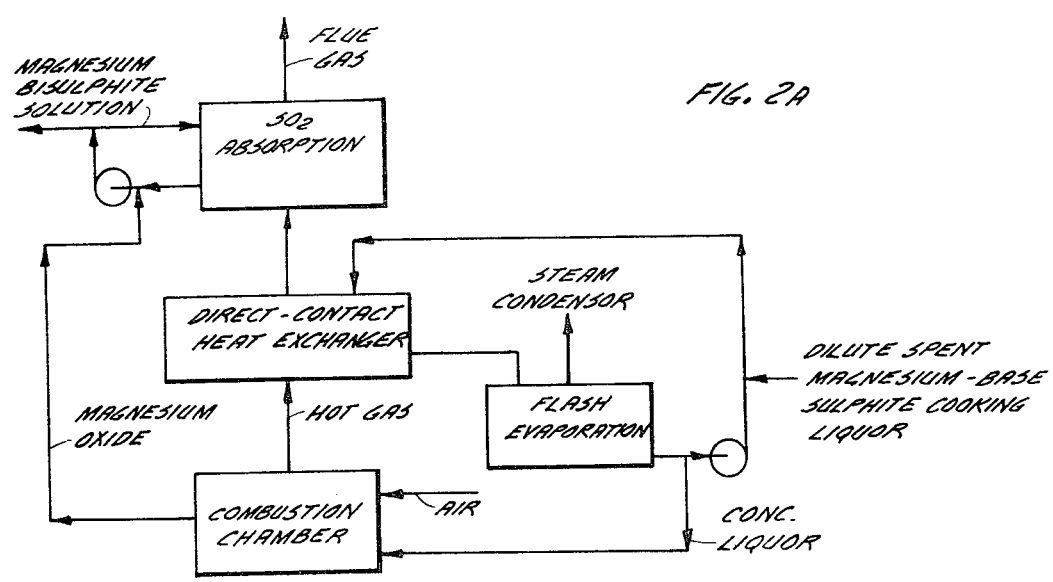
FIG. 2A is an example of that shown in FIG. 2 pertinent to the pulp and paper industry.

FIG. 2A illustrates how the embodiment of FIG. 2 could be applied to pollution abatement, and heat and chemical recovery problems within the pulp and paper industry. This embodiment would yield higher thermal efficiency than that illustrated in FIG. 1A, especially if carried out at higher than atmospheric pressures. At the lower pressures, however, the efficiency could be improved by connecting the steam line from the single-effect flash evaporator to a vacuum condensor and using the pressure differential to operate low pressure steam turbines and the resulting hot water for pulp washing, etc. At all pressures the process could be used to very good advantage in reclaiming the heat content of the steam vented from digesters, blow tanks, refiners, etc., by collecting such, compressing it to process pressure and introducing it into the process prior to the direct-contact heat exchange step.

Figure 3A:
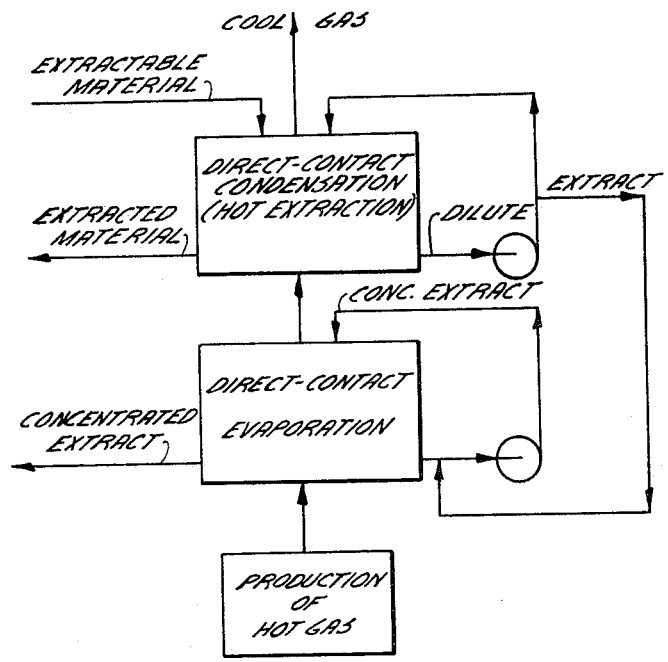
FIG. 3A is another basic embodiment in which the evaporation and condensation steps are separated to yield an extraction step.
Figure 3B:
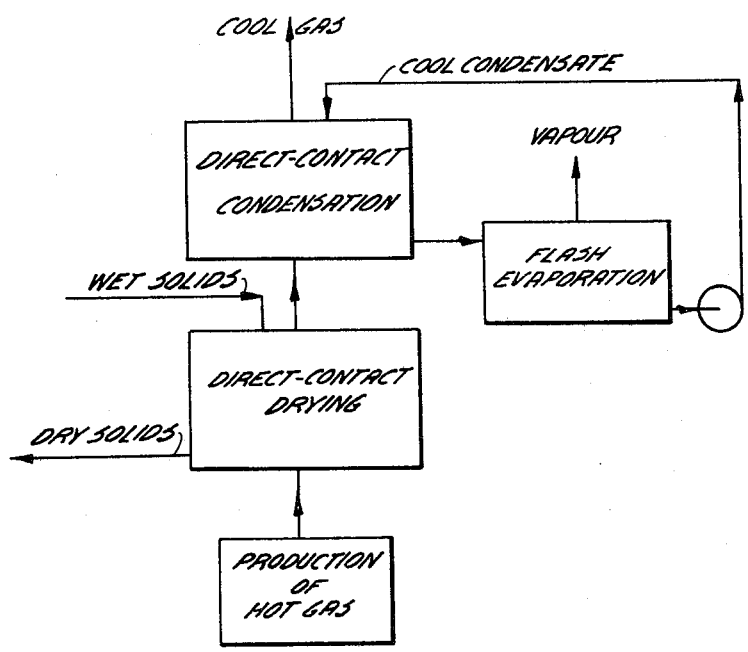
FIG. 3B is another basic embodiment in which the evaporation and condensation steps are separated to yield a drying step.

FIG. 3 illustrates a further variation wherein certain diffusible non-sprayable materials may be concentrated by mixing the sprayable and non-sprayable materials together and passing them through a diffusion chamber through which the circulating concentrated sprayable liquor is passing counter current to the flow of the materials. In a further variation the flash evaporation step of FIG. 2 could be included prior to the diffusion step.

FIG. 3A illustrates a special variation of FIG. 3 above wherein the invention can be used to extract solubles from certain diffusible or extractable materials. By separating the direct-contact-heat exchange step into condensation and evaporation steps, then by bringing the hot saturated gases into contact with the cooler material to be extracted, the volatile solvent will condense on an in the material to be extracted at which time it can extract the required solubles; the solution (of the extracted material) can then be concentrated in the evaporation step.

In the above embodiments, the dwell time of the sprayed liquid material in direct-contact heat-exchange step can be increased if desired by known methods of liquid-gas suspension, e.g. fluidize bed techniques.

An alternative method of adapting the present invention to non-sprayable material of high water content (i.e. too high for the material to support its own combustion) involves dividing the direct-contact heat exchange process into essentially two zones, namely one of evaporation and one of condensation. Thus, the wet material is brought into contact with the hot dry radiant gases until these gases become substantially water saturated and the material becomes drier, the wet gases are then separated from the material and passed through a direct-contact heat-exchanger spray tower where, as illustrated in FIG. 2, a substantial portion of water is condensed and the liquid so formed is converted into flash steam in a flash evaporator. The drier material, if combustible, can then be used to produce the hot gas. This is illustrated in FIG. 3B.

In the above illustrated examples, a spent pulping liquor (e.g kraft liquor, sulphite liquor of any base, and the like) would be an example of a sprayable material and barking and pulp and paper wastes from pulp operations would be an example of a non-sprayable material.

As shown in FIG. 4, the apparatus of one embodiment of the invention includes a main conical vessel 1 consisting of two main chambers, a lower chamber 2 for final combustion and ash separation, an upper chamber 3 having a freeboard area of liguid-gas interaction, chamber 2 having as associated equipment, an ignition and initial combustion chamber 4 for igniting the auxiliary fuel required to start and, if necessary, maintain combustion, a venturi device 5 to assist in recycling unburnt material, a screw valve 6 to release ash from combustion chamber 2, a recycle system 7 to collect unburnt material and return it via venturi 5 to combustion chamber 2, the gases from the ignited auxiliary fuel and the recycled gases and material are introduced tangentially into cyclone chamber 2 through device 5 to form a vortex such that the solid materials tend to move to the sides of the cyclone under the influence of the centrifugal forces of the vortex; and chamber 3 having, as associated equipment, pump and piping 8 to receive concentrated spent liquor and convey it to spray system 9 which distributes the spent liquor throughout the freeboard area allowing the sprayed liquor to react with the combustion gases rising from the lower chamber 2 and subsequently to collect on the sides of chamber 3 and flow into a collecting reservoir 10 or pass through opening 11 in the bottom of chamber 3 into the combustion zone of chamber 2 where the organic portion of the liquor is allowed to burn and produce further hot gases and an ash; in addition, pump and piping system 8 also delivers liquor to reservoir 12 in which the liquor is allowed to overflow and run down the sides of chamber 3 into the hotwell or reservoir 10 which feeds the pump and piping system 8; manipulation of valves 13 allow the liquor to be distributed in the desired proportion to the three locations, namely, (a) to reservoir 12, (b) to the center of vessel 1 so that a large portion will find its way into the combustion zone, and (c) to one side of the center so that a major proportion will collect on the sides of chamber 3; the combustion gases saturated with water vapour and cooled by their interaction with the sprayed liquor are vented through opening 14 at the top of chamber 3; to start up the system, the valve controlling the liquor to location (b) above would be shut off or the flow substantially decreased and the liquor circulated until the concentration of the liquor reaches the level at which it will burn in the combustion zone, the volume of liquor in the system would be maintained by the introduction of dilute liquor; once the desired concentration was reached the system would be kept at that point by opening the valve controlling the distribution of the liquor to the center of the vessel so that a portion of the concentrated liquor would be allowed to leave through the center opening and the desired volume of circulating liquor would be maintained by the introduction of fresh dilute liquor; the vortex generated in chamber 2 will tend to carry up into chamber 1 such that the liquid particles generated by the spray system will tend to move towards the sides of the chamber; the size of the opening between chambers 1 and 2 can be varied by obvious structural changes, for example by bringing reservoir 10 closer in towards the center with or without a change in the angle of slope of the sides of the upper cyclone chamber.

FIG. 5 illustrates a further embodiment based on FIG. 4 (only the right side of the figure is shown, the rest is as shown in FIG. 4) wherein the concentrated liquor is removed from reservoir 10 and passed through flash chamber 15 which is subjected to a pressure less than that in vessel 1, this lower pressure, may, for example, be maintained by a condenser which condenses the water vapour being flashed in chamber 15, the flashing and removal of the water vapour further concentrates the liquor, this further concentrated liquor is removed from the flash chamber by the pump and piping 8 and distributed as before to reservoir 12 and to the various spray points; alternative to adding dilute liquor at a point before pump 8, the dilute liquor may if desired be added in vessel 1 by spraying it into the freeboard area at some point above the main concentrated liquor sprays, this dilute liquor can thus be used, among other things, to further cool the gases and to remove concentrated liquor entrained in the upwardly moving gases.

FIG. 6 illustrates an alternative method of separating the combustion ash from the combustion gases, wherein the combustion gases from lower chamber 2 containing ash which has not already settled out on the floor of chamber 2, pass up through tubes 16 into the upper chamber 3, where it is met by a spray of concentrated liquor which washes the ash out of the gases and falls in a sedimentation cone 17 through which tubes 16 pass; the ash settles out under gravity along the sides of the cone and eventually slides down the sides to the apex of the cone where it is removed by a screwpress 18; dilute spent liquor or water is introduced though a hollow shaft turning the screw such that it enters the shaft by the exit end of the screwpress and flows counter current to the flow of ash and tends to wash out the concentrated liquid entrained with the ash, the mixture of compressed hot ash and hot dilute liquor partly flashes into steam in conduit 19 which leads to cyclone - flash chamber 20 where the ash and steam are further flashed and separated, the concentrated liquid in the sedimentation cone 17 overflows into a hot well reservoir 10 which lies under the upper lip of cone 17; pump and piping 8 remove concentrated liquor from reservoir 10 and recycle it through chamber 3 until it reaches the desired combustible concentration; if water is used in the screwpress, dilute spent liquor can be added to the recirculating concentrated liquor before pump 8 or sprayed into chamber 3 above the concentrated liquor sprays, as described for FIG. 5; as described in connection with FIG. 4, during the spraying of the liquor into the hot combustion gases, water evaporates from the liquor and leaves with the combustion gases through vent 14 at the top of chamber 3, concentrated liquor is tapped off from piping 8 and sprayed into combustion chamber 2 where with or without the help of auxiliary fuel it is burnt to form combustion gases and inorganic ash; combustion ash which settles out on the floor of chamber 2 can be removed in a number of conventional ways.

FIG. 7 illustrates a further method of separating the ash from the combustion gases, wherein the combustion gases from a chamber 2 similar to that of FIG. 6 pass through a cyclone separator 21 where the dry ash is separated from the combustion gases which then pass into a conduit feeding a number of tubes 22 which pass up through hot well reservoir 10 into chamber 3 where, as described in the above in connection with FIG. 6, they come into intimate contact with the sprayed recycling concentrated liquor, further description in connection with FIG. 6 also applies here.

In the above and in the accompanying figures, for purposes of simplicity of presentation the generation of intimate and turbulent contact between the gases and the liquor has been described simply as a spraying step with the spray nozzles shown in the usual conventional places. However, in an actual design the utmost effort should be made to create the greatest turbulence possible as well as to raise the water vapour content of the combustion gases to as high a level as possible as soon as possible after the combustible material has begun to burn. This can be done by spraying as much liquor as possible into the burning zone (particularly dilute liquor) as it can tolerate without creating incomplete combustion as well as spraying liquor into the freeboard area from as many angles as possible (somewhat in the fashion as is used in dish washers and the like) as one of the objectives of the present invention at least for most of its embodiments, is to bring the burning and concentrating steps as close together as is possible short of creating imcomplete combustion. To this end, techniques involving so-called submerged combustion can be used to advantage in this process.

Figure 8:
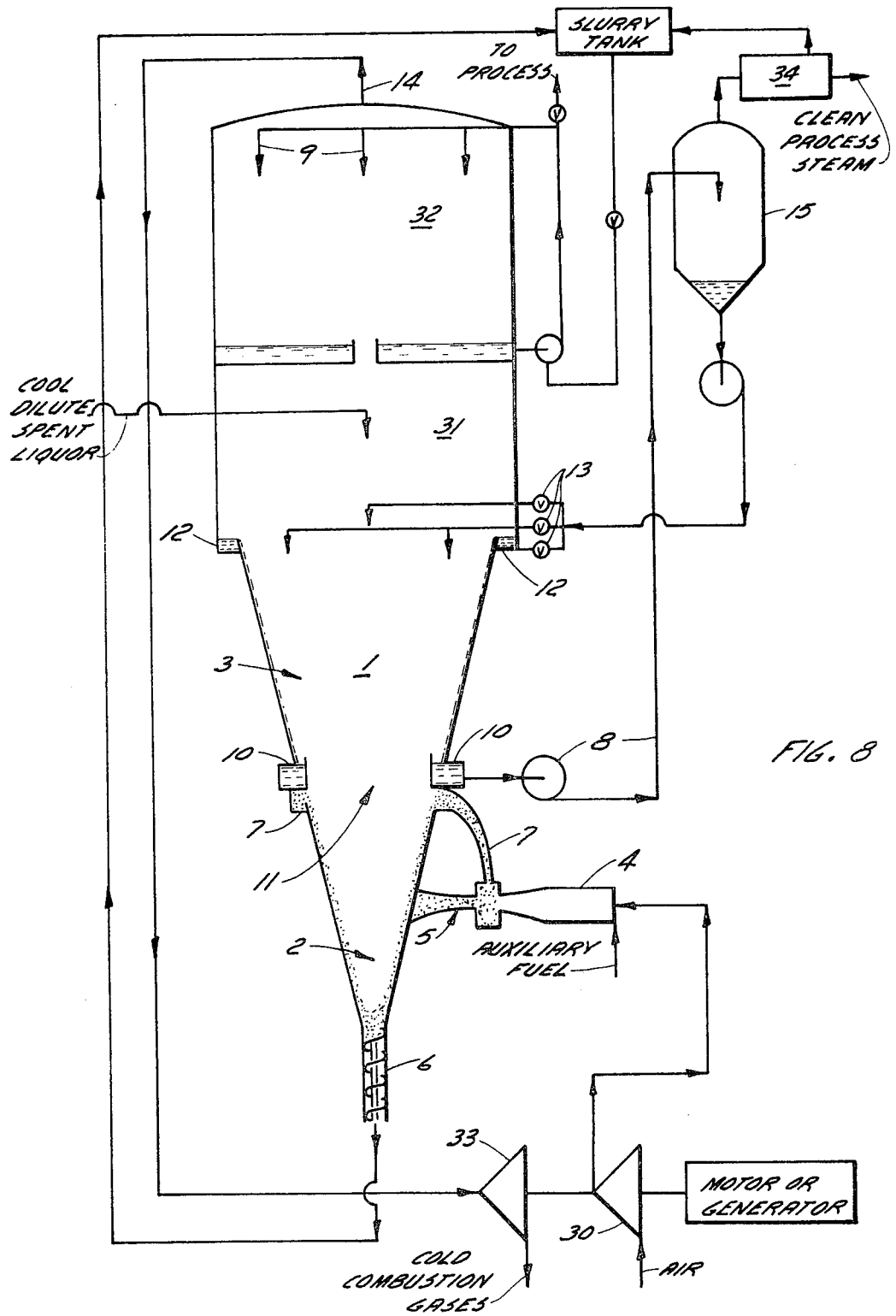
FIG. 8 is an embodiment in which the method and apparatus of this invention is carried out at an elevated pressure and temperature.

In the above, the emphasis has been on the concentration and burning aspects with disposal as the main objective. In situations where thermal efficiencies are a second main objective, the present invention can be further modified to place the thermal efficiency of the process at practically any desired level depending on the use to which the thermal values of the steam produced by the flash evaporator can be put. FIG. 8 illustrates an embodiment of the present invention in this regard.

Prior to describing the embodiment illustrated in FIG. 8 which operates essentially at a gas pressure substantially higher than atmospheric, it is to be noted that under certain circumstances the process of the present invention could operate at near atmospheric pressures with fairly high thermal efficiency. For example, in situations where quantities of cold water are available, the steam from the flash chamber (as per the example used in connection with FIGS. 2 and 5) could be passed through condensing steam turbines and the condensation of steam effected at temperatures near 100° F (i.e. high vacuum conditions) through the use of water spray towers (to again keep equipment cost at a minimum through use of direct-contact heat-exchange). The steam turbines could be used to produce mechanical energy directly or electrical energy via the use of generators.

The following embodiment could also be used to increase the thermal efficiency of the process when operated at atmospheric pressures. The flue gases containing a large quantity of heat in the form of water vapour could be brought into contact with a cool water-insoluble liquid, such as fuel oil, for example, by spraying cool oil in a second direct-contact heat-exchanger counter current to the flow of the combustion gases after they have left the first direct-contact heat-exchanger tower as described in the above examples involving concentration and burning of spent pulping liquor. The water vapour would condense to form liquid water giving up its latent heat thereby heating the oil (to approximately 212° F). The condensed hot water could be separated from the hot oil in the sump of the heat-exchanger and either be discarded or used elsewhere. The hot oil would then be pumped to a third direct-contact heat-exchanger tower where it would again be sprayed down counter current to atmospheric cool dry air; in this latter step, the air would cool the oil which after collecting in the sump would be recycled back to the second heat-exchange tower to be reheated by the moist combustion gases as described. The air now heated by the oil and its evaporative capacity increased thereby is then passed counter current to dilute spent liquor in a fourth direct heat-exchanger tower. In the fourth tower the dilute liquor is concentrated to the degree that this hot dry air is capable of evaporating water from the liquor. The air, cooled and moistened in this fourth tower is now discharged to the atmosphere and liquor from the fourth tower sump is fed to the main first direct-contact heat-exchanger for further evaporation. While this latter embodiment would appear to defeat one of the objectives of the invention namely, simplicity, it could be used to improve the thermal efficiency of a system already installed on the basis of one of the above simpler embodiments and where its conversion to one at much higher gas pressures would be impractical, and to do so, without resorting to fairly expensive indirect methods of heat transfer and multiple-effect evaporation.

The representation of the apparatus in FIG. 8 is essentially the same as that used in FIGS. 4 and 5 and reference should be made to the above text in connection with these figures for a description of the process flow. FIG. 8 differs from FIGS. 4 and 5 in the following respects:

Air is sent to a turbo compressor 30 to increase the pressure of the air to the desired level, in the present illustration, to approximately 250 psia. This compressed air is then fed to the ignition chamber where, as explained above, it provides the oxygen necessary for combustion and raises the pressure in the various processing areas, e.g. combustion, direct-contact heat exchange, gas cooling and absorption to approximately 250 psia. For better thermal efficiency, the combustion gases may be cooled by the cool dilute spent liquor in a separate cooling direct-contact heat exchange zone or chamber 31; this cooling condenses the water vapour in the gases and returns its heat content to the system. If a gas absorption stage of chamber 32 is required in an overall system, it may be advantageously added right after the cooling stage 31. To maintain a high overall efficiency the gases may then be passed through gas expander 33 where most of the energy of compression is reclaimed and used to compress further air and/or generate other forms of energy, e.g. electrical energy. As an alternate to air and compressor 30, tonnage oxygen may be used. Prior to passage through the gas expanders or turbines the gases may have to be heated to avoid freezing problems in the turbines.

The use of higher gas pressures in the direct-contact heat-exchange chamber 3 allows the liquor in hot-well 10 to reach higher temperatures. These temperatures will depend also on the composition of the gas used for combustion, the type of fuel and its gaseous combustion products. In the present example, using air and a fuel having a BTU value of 18,000 and combustion products similar to that for coal and the like, a hot-well temperature of approximately 358° F may be reached. Thus, the concentrated liquor at this temperature is then flashed evaporated in chamber 15 where it is subjected to a pressure less than that in vessel 1 or 3, but corresponding to that desired such that the steam produced can be used in other processes. In the present example, the pressure in chamber 15 was maintained at 70 psia which corresponds to a steam or liquid equilibrium temperature of 303° F. If clean process steam is desired the steam flashed in chamber 15 can be put through a reboiler 34 to produce steam at a pressure of approximately 60 psia.

In situations involving the cyclic recovery of chemicals from pulping spent liquors, the chemical ash, usually basic in nature and obtained from the combustion of the liquor, can be slurried and used to recover the acidic component of the liquor which is usually present in the combustion gases. This aspect is illustrated in FIG. 8. Here the alkaline ash is slurried with condensate from the reboiler and the slurry cycled through a gas absorption tower, which can form a part of the pressure heat recovery system, to recover the acidic component in the combustion gases. The chemical solution or slurry so formed can then be sent to the pulping liquor preparation system for further use in the pulping process. The steam too from the flash chamber or the reboiler can be used in the pulping process. In this sense, the present invention can form a part of an overall cyclic chemical and heat pulping process.

In the case for using the same system for the disposal of more than one waste where these wastes cannot be mixed for incineration purposes, for example, in the disposal of spent pulping liquor and bark. In such a case, the furnace could be divided into separate areas so that the ash from the incineration of each waste can be collected separately yet the combustion gases from the various incineration areas can be combined and sent to a common direct-contact heat-exchanger.

The range of process parameters of the invention, such as pressure and temperature, are determined essentially by current economics and the state of the art in the related technologies as well as by well known natural laws. Thus, if it is desirable to produce process steam at a fairly high pressure then natural laws will dictate the pressure required in the combustion chamber and main heat-exchange vessel, such a pressure may be of the order of 1000 psia or more, and if it is economical to compress air to this pressure or to use tonnage oxygen then the production of steam at said high pressure could be economically feasible.

The efficiency of the initial direct contact heat-exchange (i.e. the conversion of the sensible heat of the hot gases into the latent heat of evaporation of the water from the liquor) can be increased by use of the venturi principle in many of the above direct-contact heat-exchangers. In such a case for example, the hot gases would be fed into/through a venturi device (U.S. Pat. No. 3,469,617 illustrates one such device) to which will also be fed part of the cooled liquor from the flash chamber. The proportion of hot gases to liquor and the design of the venturi will depend on the heat balance required, temperature of gases etc. One objective might be to combine the gases and liquor such that the gas will remain below the water saturation point so that following the venturi-mixing of the gases and liquor, the mixture would be scrubbed by a spray of the remaining cooled liquor.

In all of the above direct-contact heat-exchanger steps an important feature of the present invention is that the liquid being heated or cooled in the heat-exchanger is continuously recycled through the heat-exchanger at a rate independent of the rate at which liquid is added or taken away from that particular heat-exchanger step. For purposes of diagram simplicity, this feature is not shown in FIGS. 2, 3, 5 and 8. FIG. 1, on the other hand, illustrates this feature clearly. In case of FIG. 8, for example, part of the liquor from pump 8 would recycle continuously to the various spray points in chamber 1 at a rate determined independently of the balance of the flow of the liquor from pump 8 to chamber 15; the liquor from chamber 15 would then, at its own flow rate, also be recycled continuously to the various spray points in chamber 1. This allows for the operations in the direct-contact heat-exchanger to be controlled separately from those in the flash chamber.

In certain applications, where undesirable volatile pollutants are present in the waste and minimum overall pollution is required, various other embodiments can be used. For example, by adding certain chemicals to the recycling liquor these undesirable volatile pollutants could be kept in solution; the addition of alkali such as lime or caustic, for example, would keep certain acidic volatile pollutants (e.g. $SO_2$, $H_2S$ etc.) in the liquor so that they would appear later in the combustion ash or smelt. In cases where the condensate from the flash chamber will become polluted by undesirable volatile pollutants, (in place of or in addition to the above chemical addition), the direct-contact heat-exchange and flashing steps may be divided into two so that the initial liquid waste may be partly concentrated separately and the volume of contaminated condensate kept to a minimum. Where these volatiles are organic or less objectionable after being burnt, they may be stripped from the waste and/or as much raw waste as possible introduced into the combustion zone.

The application of this invention to municipal wastes or sewages would be very similar to that described above for the spent materials from pump and paper mills as in these cases, water would be the main volatile. Materials in the wastes, difficult to spray or to bring into intimate contact with the hot gases could be removed in settling tanks and the thickened sludge incinerated in the combustion chamber with the aid of auxiliary fuels; the dilute effluents would be concentrated as described and incinerated also.

The application of the invention to spent materials from such industries as the oil industry would require some modification as the volatiles (volatile, that is, relative to the much less volatile constituents in the material) would often be combustible as well. In which case, before bringing the hot gases in contact with these combustible volatiles, the temperature of the gas would have to be reduced below the flash point of the volatile. This could be easily accomplished by passing the gases through a series of water cooled coils, fins and the like. The volatile can be recovered from the flash chamber by condensing the gas or vapour produced therein.

Figure 9:
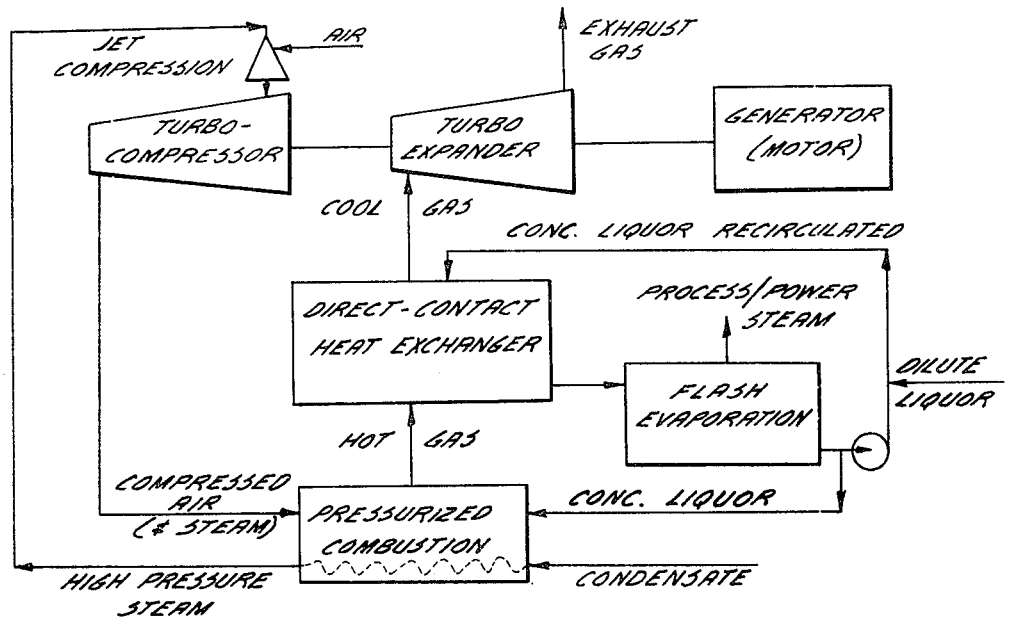
FIG. 9 is an embodiment involving a method to produce electrical energy and a method to aid in compressing the air required for combustion.

Another very interesting application of the present invention lies in the generation of mechanical or electrical power with turbines operated on "power gas" produced from coal or oil especially for that type of gas (such as Lurgi power gas) which when burnt produces a substantial amount of water vapour. For such an application, an embodiment of the present invention could be described as follows: compressed air or (tonnage) oxygen and power gas would be fed to a combustion chamber closely connected to a direct contact heat-exchanger unit similar to that described herein except no provision for ash removal would be necessary, where the gas would be burnt at as high a pressure as would be economically feasible; the heat-exchanger unit and flash chamber would be run as described above except ordinary water would be used in place of spent industrial material; the compressed gases from the heat-exchanger unit would be passed through gas turbines and steam from the flash chamber used to operate steam turbines. The energy from these turbines would be used to generate electricity (and if necessary operate the air compressors). This is illustrated in FIG. 9. Other embodiments of the present invention mentioned herein could also be used to help solve other problems, e.g. pollution, heat losses, etc. associated with the use of power gas for generation of energy.

The present invention could of course be used in a similar manner for other thermal units (using oil or coal directly in the combustion chamber, for example).

Figure 9A:
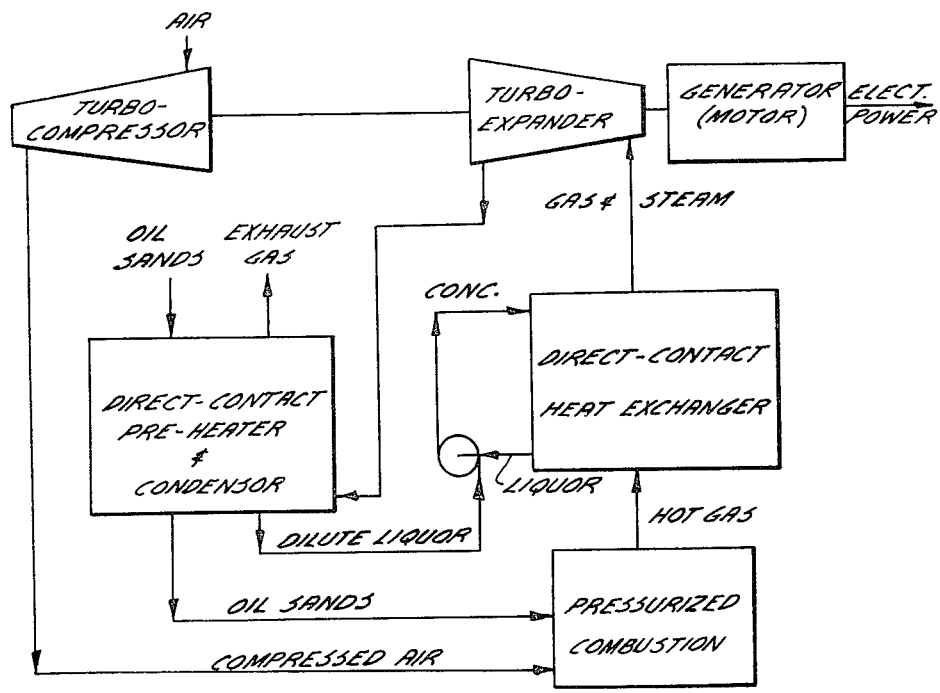
FIGS. 9A and 9B are embodiments involving that of FIG. 9 and applying it to various fossil fuels.
Figure 9B:
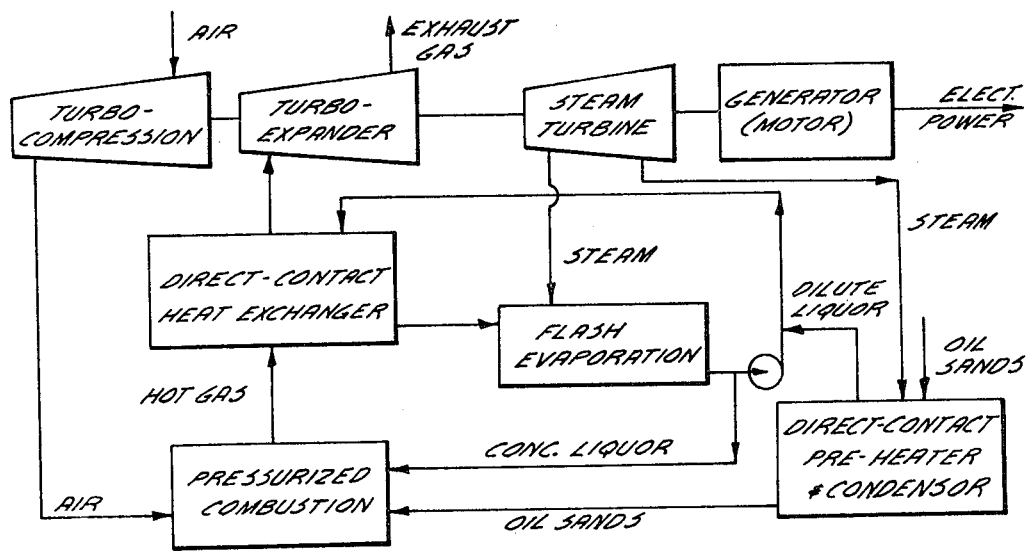

Another application of the present invention for the generation of power would be its use with fossil fuels, other than oil or coal, e.g. lignite, oil sands/shales, etc. This is illustrated in FIG. 9A. The capacity of the condensor could be increased by various conventional methods (e.g. outside cooling cycle). In the present embodiment all of the gas/vapour formed in the pressure combustion chamber would pass through the turbo-expander. In another embodiment illustrated in 9B the thermal energy generated in the combustion stage would be separated into two separate gas/vapour streams and each passed through its separate turbo-expander.

Figure 9C:
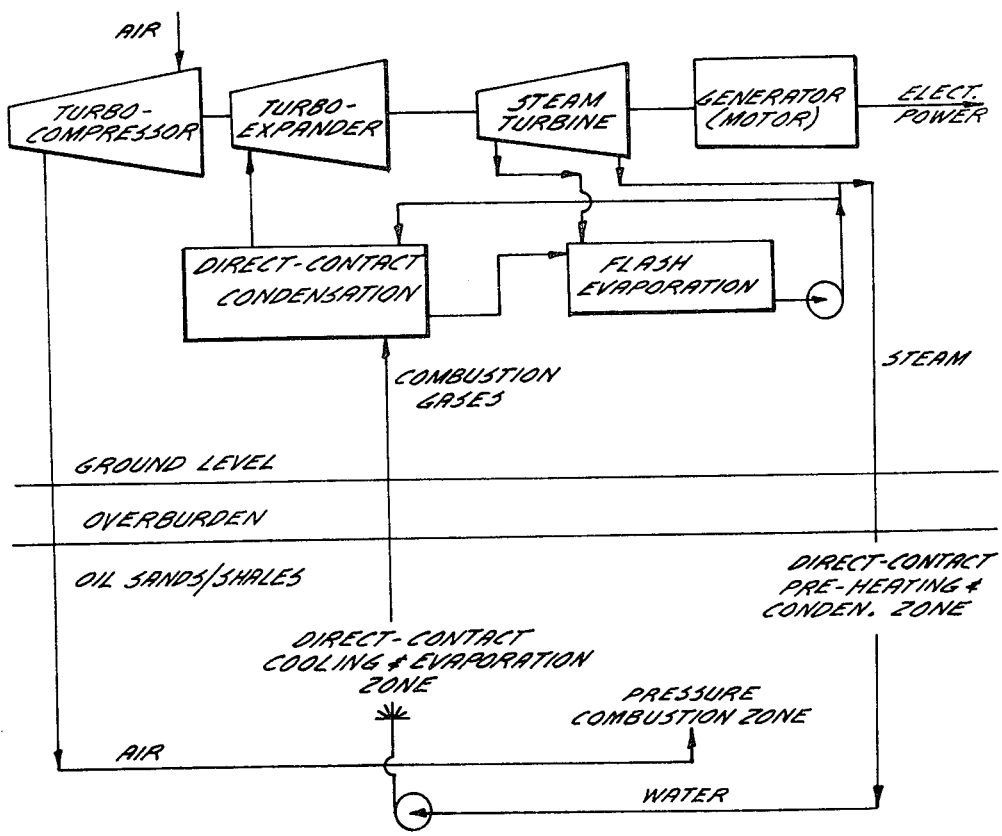
FIG. 9C is an embodiment involving FIG. 9B in which part of the process takes place in situ.

The above two approaches illustrate an off-site or on-site application. In a further embodiment an "in situ" approach is possible and this is illustrated in FIG. 9C where the combustion would be carried out underground under pressure. Here the hot pressurized gases formed would be cooled by water sprays until saturated with water vapour and the mixture of gas and vapour sent above ground for further direct-contact exchange (e.g. condensation) and the generation of steam/power. (Such an approach could also be used with coal.)

An even more interesting application would be where such thermal units could be used in association with the problem of incinerating and concentrating industrial and municipal wastes, in which case the above heat exchanger water would be replaced by such wastes and the process of this invention used effectively in both the energy and pollution problems of the day.

If the above power systems were reduced to a very small scale, the present invention could be used to drive small power driven vehicles (e.g. cars, trucks, etc.) with the use of fuels heretofore never considered (e.g. water-diluted organics). There would be little loss of heat from engine cooling as the present air cooling would be used to condense the steam after the turbines so as to maintain the desired vacuum.

Problems of freezing in the turbo-expander applications could be alleviated by by-passing some of the hot gases to the turbine and/or interstaging it with the turbo-compressor.

Since the capital cost of turbo-compressing air can be high, one method to bring this into better balance would be to use steam jet compression techniques in combination with the present invention. This is illustrated in FIG. 9. As indicated a specific amount of very high pressure steam could be used to bring the air up a predetermined pressure level economically optimum for turbo-compression. The remaining heat content of the steam so used would then be recovered with the overall system covered by this invention.

A further application of the present invention would be for the extraction of oil from oil sand/shales. Two particular approaches will be disclosed briefly.

Figure 10:
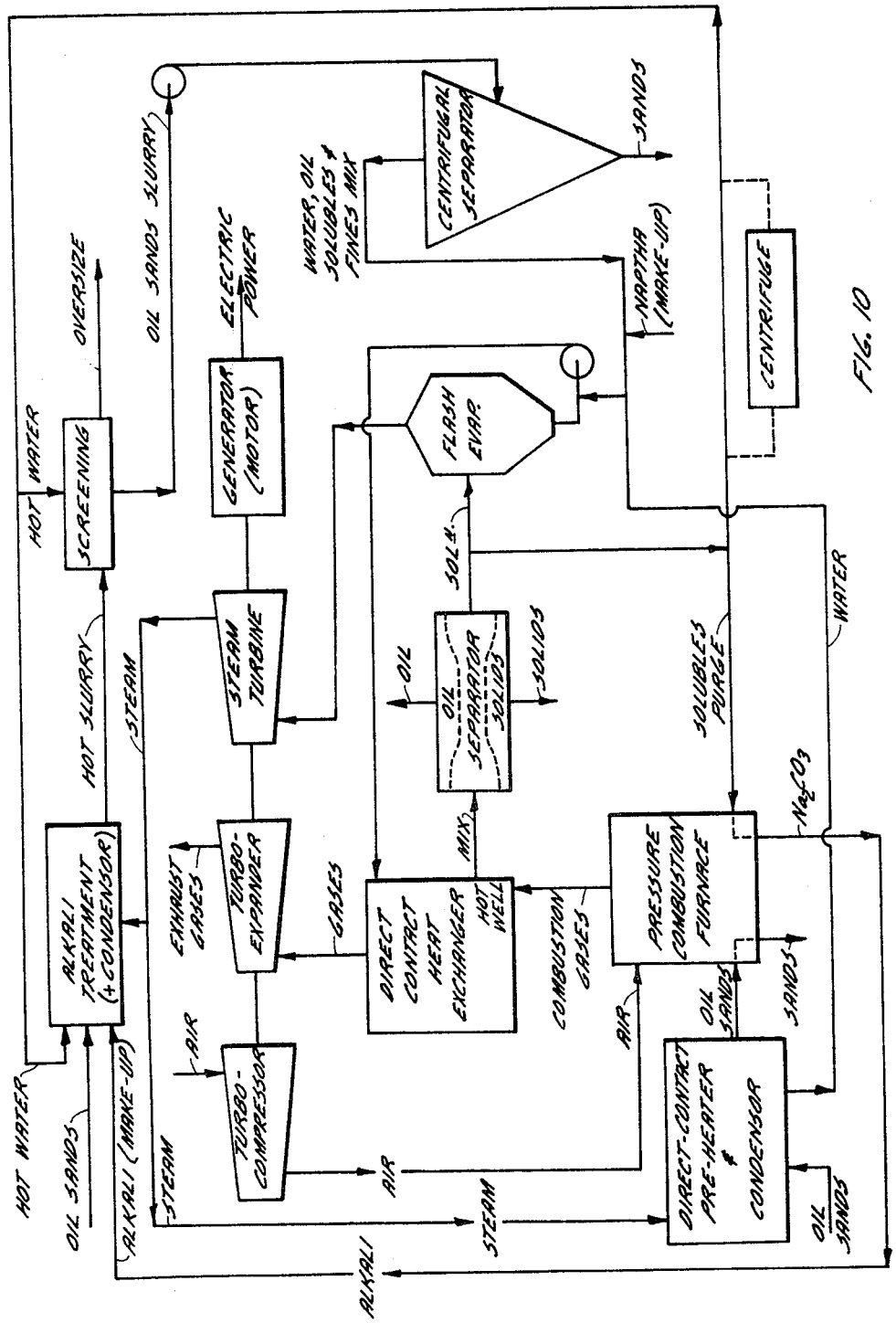
FIG. 10 is an embodiment involving the extraction of oil from oil sands/shales using a hot alkaline water-gravity-extraction process.
Figure 11:
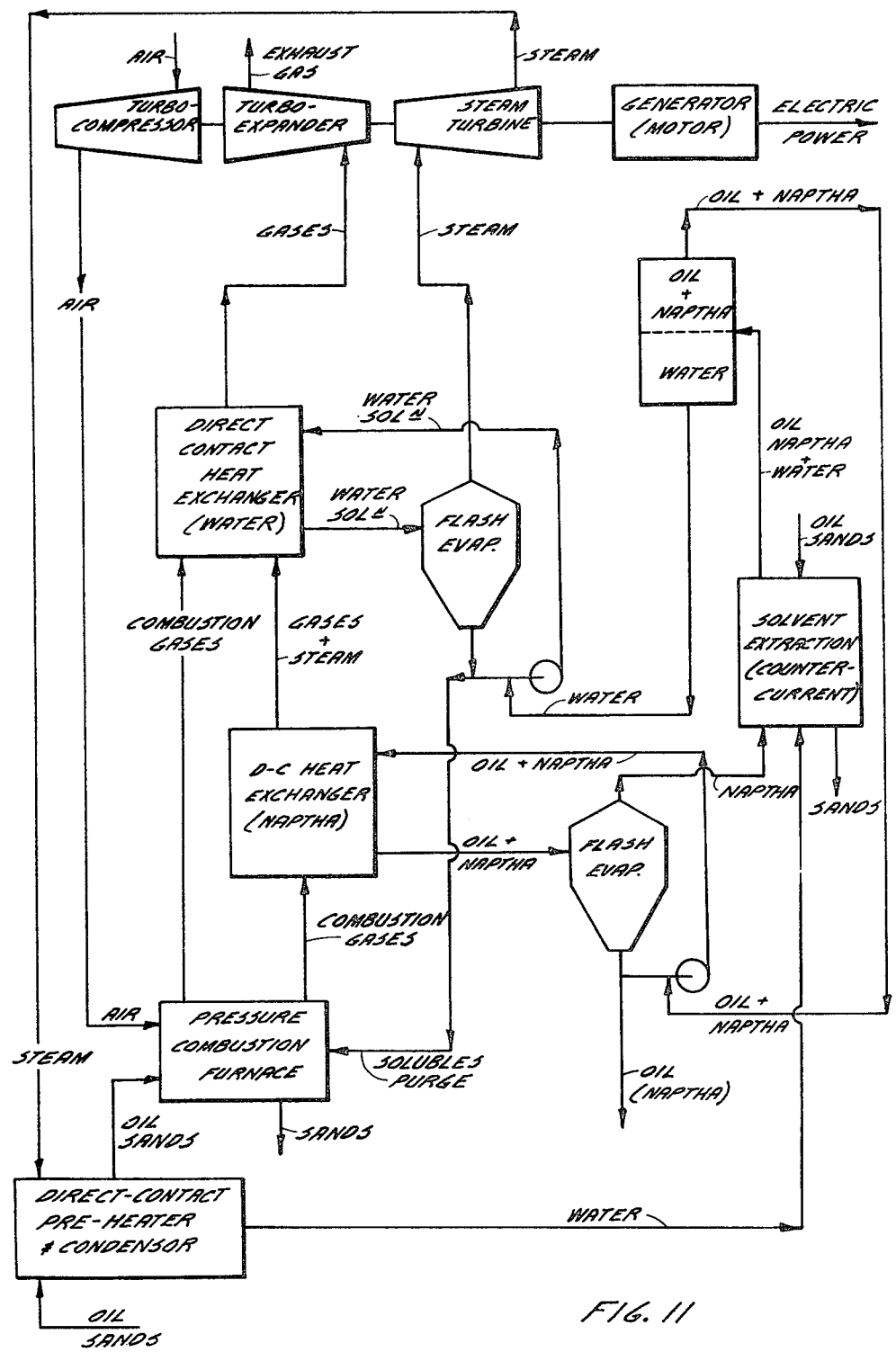
FIG. 11 is an embodiment involving the extraction of oil from oil sands/shales using a solvent-type extraction process.

One is graphically illustrated in FIG. 10 and may be called the "Hot Alkaline Water-Gravity-Evaporative Oil Extraction Process". It is known that a hot alkaline water treatment (pH 8-8.5) of the oil sands places the "sands" in a condition where the bulk of the mineral component can fairly readily be separated from the oil component. While this can be done in a gravity separator, it is proposed here (for purposes of a continuous operation) that a centrifugal separator be used (e.g. similar to that used in the pulp and paper industry). It will also be noted that a minimum amount of coker naphtha is added for a number of purposes, e.g. defoaming; to decrease both the specific gravity and the viscosity of the oil component and facilitate its separation from the water component in the "Separator". The naphtha can be recovered as shown in FIG. 11 or by conventional methods away from the plant and returned to the plant site in the containers used to transport the oil away from the site. The evaporative capacity of the power plant serves to concentrate the various fractions to the point where they are more amenable to separation in a gravity separator or hydraulic cyclone. To increase the extraction of energy from the steam turbines both the alkali treatment chamber and the oil sand (fuel) pre-heater may be closed to the atmosphere so that they can be operated as vacuum condensors. Evaporation and calcination of the soluble component in the furnace will yield sodium carbonate for re-use in the alkali treatment. A centrifuge or equivalent device may have to be used in various places to keep the fines build-up under control. Addition of special defoamers to the flash-evaporation cycle may also be necessary. Probems associated with oil-spills have led to the development of a number of special chemicals which assist the separation of the oil from other materials to which it tends to cling. These chemicals could be used to assist/replace the alkali in the above system and the concentration cycle used to recover the chemicals for re-use.

Another approach is illustrated in FIG. 11 and may be called the "Solvent-Oil Extraction Process". Since the thermal efficiency of the Pressure Combustion Direct-Contact Heat Exchange Process is based on the "squeezing-out" of the water content in the exhaust gases, this same "squeezing-out" feature can be used to recover any solvent that is used to extract the oil from the sands. Any suitable organic solvent can be used with naphtha being one such solvent. Since the dew point of naphtha is higher than that for water, it will condense out first (separately from the water) in the Naphtha Heat Exchanger where a naphtha solution of oil is the heat exchange medium and any steam in the combustion gases will pass on to the Water Heat Exchanger where water is the main heat exchange medium. There are a number of ways that the residual naphtha in the sands could be recovered; one method could involve a sequential water displacement technique (see FIG. 11); another approach would be to set up a stripping chamber prior to the D-C (Naphtha) Heat Exchanger and pass the naphtha-sands through it counter current to the hot combustion gases.

In the above two examples, the oil sands/shales, essentially "as mined", where shown to be the source of fuel in the pressure combustion furnace, it is understood, of course, that because of their water content/low calorific value it could well be necessary that an auxiliary fuel may have to be supplied in order to keep the combustion primed without this affecting the high thermal efficiency of the overall system. Also, while in both examples, the approach of FIG. 2 was used, it should be noted that it is also possible to use the approach of FIG. 1. In fact, in both these approaches, it is conceivable, given the proper oil sand composition, that the combustion gases could be made to operate a fluidized bed such that on feeding a naphtha-treated oil sand to the bed the oil-naphtha and water fractions could be made to leave the sands and move with the gases, to be separated later from the gases in a cyclone. If workable, such a simplified approach would indeed be highly desirable.

Looking at the Pressure Combustion DCHE Process in relation to the present oil sands process of the Great Canadian Oil Sands Ltd. one can view it as an auxiliary process that can consume a large proportion of the (pollution-causing) water effluents that emanate from that process and convert the water into useable steam all at very high thermal efficiencies (plus the possible recovery of the sodium salts as sodium carbonate for re-use in the process). In addition it can use the oil sands as mined for fuel in the Combustion Process and enriched where necessary with the oil being recovered. In cases where the gas-flotation process is the most efficient for separating the oil, use can be made of the pressurized combustion gases by bringing the various oil-water fractions into intimate contact with these gases (thereby absorbing gas) and then subjecting the fraction to atmospheric pressure where the dissolved gas will form the required foam/froth.

The combination of the present process with other thermally induced reactions such as the inventor's novel pyrolysis process gives rise to a process for producing a combustible gas of high heating value from various organic wastes/materials.

The pyrolysis process (described elsewhere in more detail in a co-pending application) involves pyrolyzing organic material in a stream of highly superheated steam and a limited amount of oxygen (air) such that the reaction begins suddenly at a high pressure and temperature, after which the pressure is rapidly lowered adiabatically (to some medium pressure) thereby subjecting the organics (and any inorganics present) to simultaneous thermal and pressure shocks which bring out the desired results in a very short time and in a very small space. Besides the conversion of the organics into such combustible gases as hydrogen and carbon monoxide, etc., the process also converts any inorganics (present with the organics) into more useful compounds. For the latter result, a good example is the conversion of the sodium compounds such as sodium sulphate, sodium lignosulfonate, etc. to sodium carbonate; the rapid depressurization is probably a more critical aspect for the inorganic conversion than it is for the organic so that in the absence of inorganic the conditions for the pyrolysis would probably be less stringent.

Following pyrolysis the gases would pass to a cyclone to remove the solids (carbon and any inorganics), thence to a flash drier where their heat content could be used to dry the organic material, then to a direct-contact heat exchanger (DCHE). Since (a) steam (and a limited amount of air) is used to initiate the pyrolysis (instead of hot gases from the combustion of oil or coal) and (b) the DCHE is operated at a relatively high total pressure, the combustible gas leaving the DCHE will contain little water varpour and little non-condensable non-combustible gases such as nitrogen, carbon dioxide, etc. and this in turn will increase the heating value (BTU/cu. ft.) to a relatively high level. The above steps are illustrated graphically in FIG. 12 where the above is applied to a cyclic sodium bisulphite high yield pulping heat and chemical recovery process.

The symbols used in FIG. 12 have the following meaning:

| | |
|---|---|
| sh - superheated | u - ultra |
| SL - spent liquor | CSL - concentrated SL |
| SLS - SL solids | JC - Jet Compressor |
| PM - paper machines | X - concentration higher than conventional |
| $P_1 > P_2 > P_3 >$ etc - Pressure greater than (optimum values to be determined) | |
| M - mixing device | HS - high sulphur |
| P - pyrolysis | |

The novel aspects of the pyrolysis and evaporative steps have already been discussed above. As shown in FIG. 12 the pyrolysis gases are used to produce electrical/mechanical energy. In the chemical production steps of this novel process, it is noted that by combining the burning of high sulphur fuels (coal, oil, etc.) with a chemical pulping recovery process, the sulphur of the fuel is converted into other useful compounds, such as sodium sulphite, for re-use either in the cyclic process or elsewhere. A recycling procedure in absorption tower allows the concentration to build up to a desired level. Also by adding inexpensive and readily available saltcake ($Na_2SO_4$) along with the carbon, to the concentrated sulphite liquor the process produces an excess of sodium carbonate (and sulphur gas) for make-up and/or for sale. The use of the carbon (produced from the pyrolysis) to decontaminate the various condensates allows the condensates to be used in more effective ways; and the carbon, so used is returned to the process to produce combustible gases. In the cooking and refining steps it is noted that the wood is cooked with a chemical concentration much higher than is conventional. This lowers the refining energy required to produce an acceptable pulp at a given yield alternatively the yield can be increased for a given energy input. The spent cooking liquor is recycled through the cooking liquor preparation and wood digester steps thereby reducing the evaporative load for the final spent liquor. As mentioned above, in connection with FIG. 2A, the steam vented from digesters, blow tanks, refiners, etc. could be compressed and fed into the process prior to the direct-contact heat exchanger step and its heat content reclaimed in a cyclic fashion.

While in the above evaporative applications have been more common, as mentioned previously the use of the present invention for the purpose of drying, gas absorption/stripping and extraction should not be overlooked. The use of the Process to cover these operations, particularly when the Process is under pressure, will greatly increase the overall thermal efficiency. While the main applications will involve water as the condensable volatile component, it should be clear that the Process is applicable to other such components, e.g. in the chemical and petroleum industries where various organic solvents are used in large quantities.

Besides improving thermal efficiency, the use of the Process under pressure also results in a highly compact, transportable operation which, as pointed out above, can reduce the present rapidly escalating transportation costs by moving the operation closer to/with the changing raw material source/product end-use application. An interesting application in this regard would be its use in a large apartment complex. Here the liquid sewage could be concentrated (evaporated) to provide steam for generation of electric power and heating and the condensed steam used as a source of water; the concentrated sewage and solid garbage would be burnt to provide the heat to operate the Process and the organics could be either pyrolyzed to yield combustible gases for cooking and power generation purposes (and carbon for final water purification) or completely burnt for power generation purposes. Thus, by making the complex more or less self-sufficient in terms of services (water, sewage, electric power) the operating cost of the complex could be less in the present environment of rapidly escalating taxes/costs to provide these services from a long distance.

From the above description, it will be seen that there is provided an apparatus which includes a means of heating a gas to a desired temperature, means of introducing said gas into a vessel containing a lower reservoir of the material to be treated and an upper freeboard area, means for removing a portion of said material from said reservoir and of subjecting it to and/or bringing it into intimate contact with said heated gas within said freeboard area, means of collecting that material in said freeboard area which is still in liquid form and of conveying it to said reservoir, means to continue heating and introducing a gas, means of removing, subjecting, collecting and conveying the material in a recycle fashion until the material has changed to a desired state, means on introducing sufficient unchanged material to said reservoir and of removing sufficient changed material from said reservoir in order to maintain the recycling material at the desired state. From the above description and diagrams it will be readily apparent what other means will be required to implement the various embodiments of this invention.

Inasmuch as the foregoing description comprises preferred embodiments of the invention which were selected merely for purposes of illustration, it is understood that the invention is not restricted thereto and that modifications and variations may be made therein in accordance with the principles disclosed without departing from the invention.

I claim:

1. A method for the reclamation of oil and its energy values from material containing said oil, at subtantially any desired thermal efficiency, which comprises continuously (A) subjecting said material to a combustion step at a pressure substantially above atmospheric and with the aid of a combustion supporting gas thereby producing an ash containing an incombustible part of said material and hot radiant gases, which gases include water as a condensable vapor and relatively noncondensable combustion gases;

(B) bringing said hot radiant gases into intimate and turbulent contact, for efficient and rapid direct-contact heat exchange, with a liquiform mixture of intermediate concentration which contains substances including water, oil, solubles, and various solid fines, and whose temperature is lower than the highest temperature the said liquiform mixture could have when in equilibrium with said hot radiant gases at said given pressure, such that maximum simultaneous use is made of the three main modes of heat exchange namely radiant, mass and conductive exchange, all within one given region by providing the required space, time and contact for (1) maximizing said exchange particularly said mass exchange, and simultaneously (ii) heating and evaporating said liquiform mixture, and (iii) cooling said hot gases and (iv) saturating said non-condensable gases with water vapor;

(C) removing said heated liquiform mixture from said heat exchanger;

(D) separating some oil and some of said solid fines from said heated liquiform mixture to form a residual liquiform solution of intermediate concentration and an oil fraction and a solid fines fraction;

(E) flash evaporating said residual liquiform solution at a pressure lower than said given pressure to thereby (a) convert a part of the water present in said solution into steam and (b) further concentrate said solution and (c) cool said solution to a temperature lower than said equilibrium temperature;

(F) removing and recycling said cooled solution from said flash evaporation to said direct-contact heat exchanger for further heating to said equilibrium temperature;

(G) adding to said cooled solution, prior to recycling it to said heat exchanger, a volume of said liquiform mixture in dilute form;

(H) removing a portion of said liquiform solution prior to said flash evaporation to keep the volumes in balance;
(I) removing said ash from said combustion step and removing said cooled gases from said direct-contact heat exchanger to reclaim their energy values by passing them through a turbo-expander;
(J) removing said oil fraction to effect said oil reclamation and removing said solid fines fraction to avoid a build-up of said fines; and
(K) removing said steam under pressure from said flash evaporator and recovering its heat value as a process vapor to thereby establish said desired thermal efficiency.

2. A method of recovering in situ underground the energy values of materials containing oil at substantially any desired thermal efficiency, which comprises continuously
(A) subjecting said material to a combustion step in situ underground at a pressure substantially above atmospheric and with the aid of a combustion supporting gas thereby producing an ash containing the incombustible part of said material and hot radiant gases which gases include water as a condensable vapor and relatively non-condensible combustion gases;
(B) allowing said hot radiant gases under pressure to come into imtimate and turbulent contact with water such that said gases are cooled and become saturated with water vapor;
(C) removing said saturated cooled gases under pressure to a direct-contact heat exchanger above ground and bringing them into intimate and turbulent contact with a stream of water such that said water vapor in said gases condenses and heats said stream of water to a temperature which is in equilibrium with said gases at said pressure;
(D) removing said heated stream of water from said heat exchanger;
(E) flash evaporating said heated water at a pressure lower than said given pressure to thereby (a) convert a part of said water into steam and (b) cool said water to a temperature lower than said equilibrium temperature;
(F) removing and recycling said cooled water from said flash evaporator to said heat exchanger for further heating to said equilibrium temperature;
(G) removing said cooled gases under pressure from said direct-contact heat exchanger to reclaim their energy values by passing them through a turbo-expander;
(H) removing said steam under pressure from said flash evaporator and recovering its heat value as a process vapor thereby establishing said desired thermal efficiency.

* * * * *